United States Patent
Hagihara et al.

(10) Patent No.: US 11,585,434 B2
(45) Date of Patent: Feb. 21, 2023

(54) PLANETARY GEAR DEVICE CARRIER AND PLANETARY GEAR DEVICE

(71) Applicant: ENPLAS COPORATION, Kawaguchi (JP)

(72) Inventors: Toru Hagihara, Kawaguchi (JP); Mincheol Sin, Kawaguchi (JP); Shuhei Masuda, Kawaguchi (JP)

(73) Assignee: ENPLAS CORPORATION, Kawaguchi (JP)

( * ) Notice: Subject to any disclaimer, the term of this patent is extended or adjusted under 35 U.S.C. 154(b) by 0 days.

(21) Appl. No.: 17/594,540

(22) PCT Filed: Apr. 15, 2020

(86) PCT No.: PCT/JP2020/016490
§ 371 (c)(1),
(2) Date: Oct. 21, 2021

(87) PCT Pub. No.: WO2020/218099
PCT Pub. Date: Oct. 29, 2020

(65) Prior Publication Data
US 2022/0186828 A1 Jun. 16, 2022

(30) Foreign Application Priority Data

Apr. 22, 2019 (JP) .............................. JP2019-081070
Jul. 10, 2019 (JP) .............................. JP2019-128462
Feb. 12, 2020 (JP) .............................. JP2020-021371

(51) Int. Cl.
*F16H 57/08* (2006.01)
*F16H 1/28* (2006.01)

(52) U.S. Cl.
CPC ............. *F16H 57/082* (2013.01); *F16H 1/28* (2013.01)

(58) Field of Classification Search
CPC .................................. F16H 57/082; F16H 1/28
See application file for complete search history.

(56) References Cited

FOREIGN PATENT DOCUMENTS

| JP | 10153241 A | * | 6/1998 | ........... F16H 57/082 |
|----|------------|---|--------|------------------------|
| JP | H10-153241 A | | 6/1998 | |
| JP | 2007-056885 A | | 3/2007 | |
| JP | 2015-113851 A | | 6/2015 | |
| JP | 2016-500428 A | | 1/2016 | |

OTHER PUBLICATIONS

International Search Report dated Jul. 7, 2020 (2 pages), in International Patent Application PCT/JP2020/016490.

\* cited by examiner

*Primary Examiner* — Derek D Knight
(74) *Attorney, Agent, or Firm* — Sterne, Kessler, Goldstein & Fox P.L.L.C.

(57) ABSTRACT

To reduce assembly man-hours of a planetary gear device by devising a structure of a carrier, disclosed is a carrier of a planetary gear device 1 is formed with a gear housing space for housing a sun gear and a planetary gear. The gear housing space is formed between a pair of gear support parts rotatably supporting the planetary gear by a gear support shaft. The pair of gear support parts are integrally connected by a plurality of beams. The beam has a virtual plane orthogonal to a rotation axis of the sun gear as an x-y plane, and a radial direction of a direction extending radially from the rotation axis along the x-y plane is formed along a radial direction at a radially outer position of the sun gear. The planetary gear is located between the beams.

19 Claims, 12 Drawing Sheets

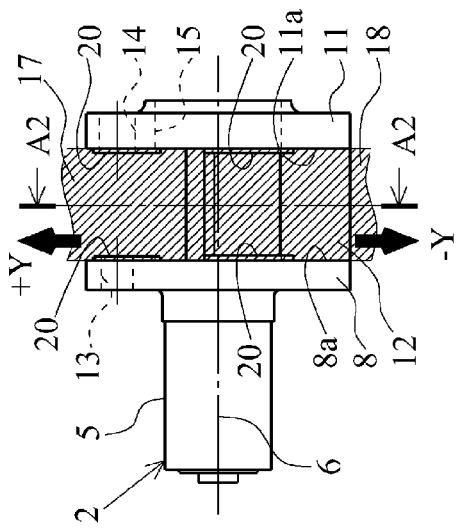
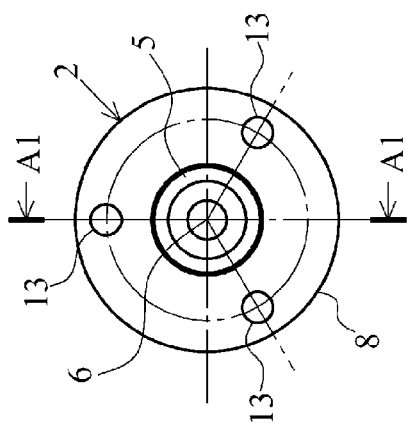

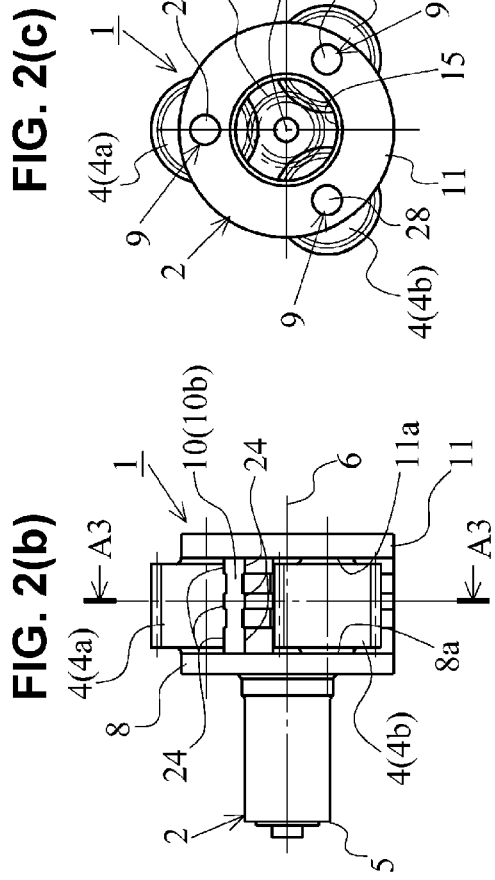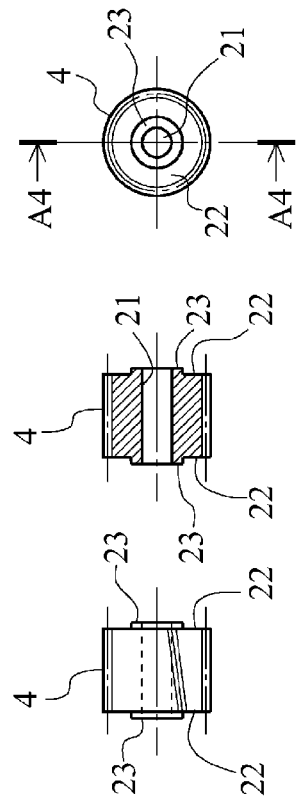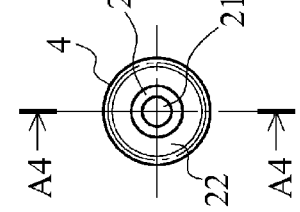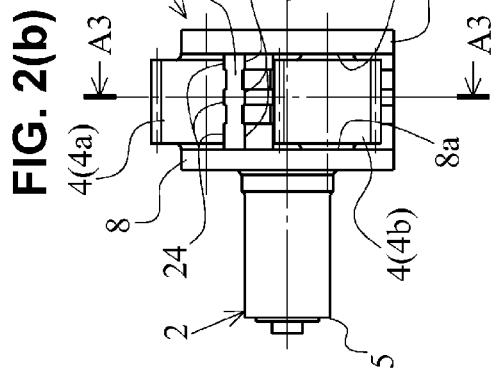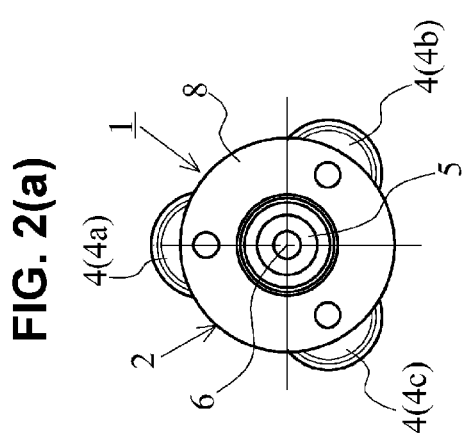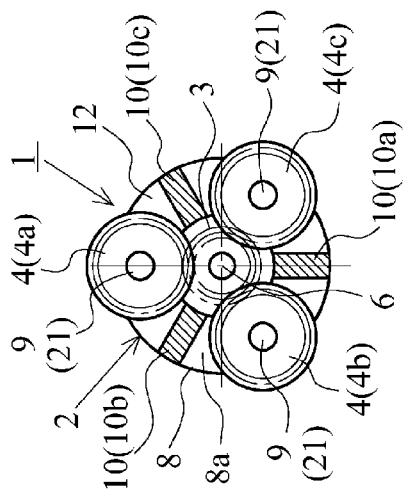

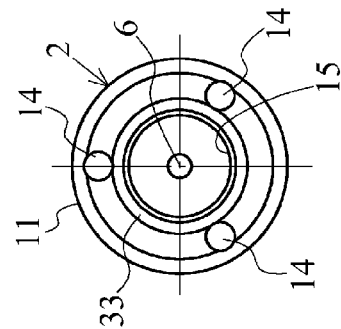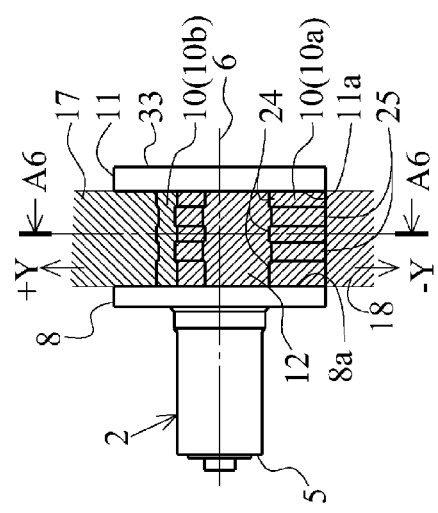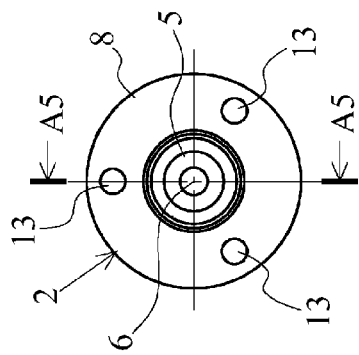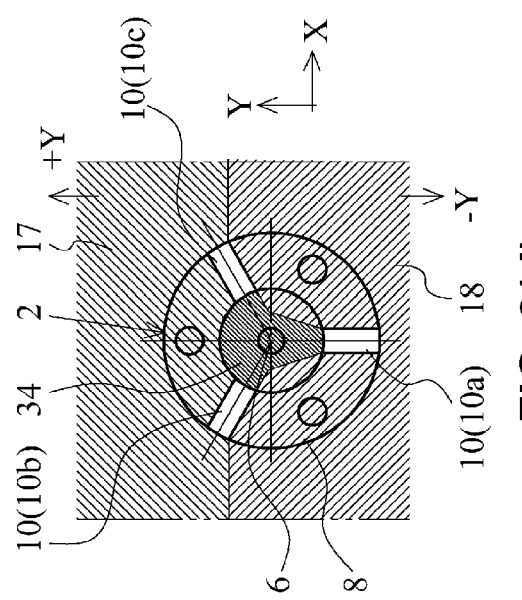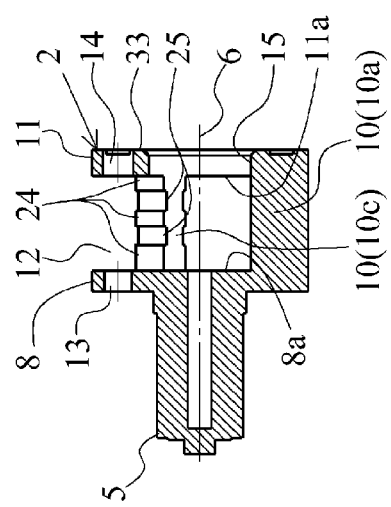

[Fig. 7]
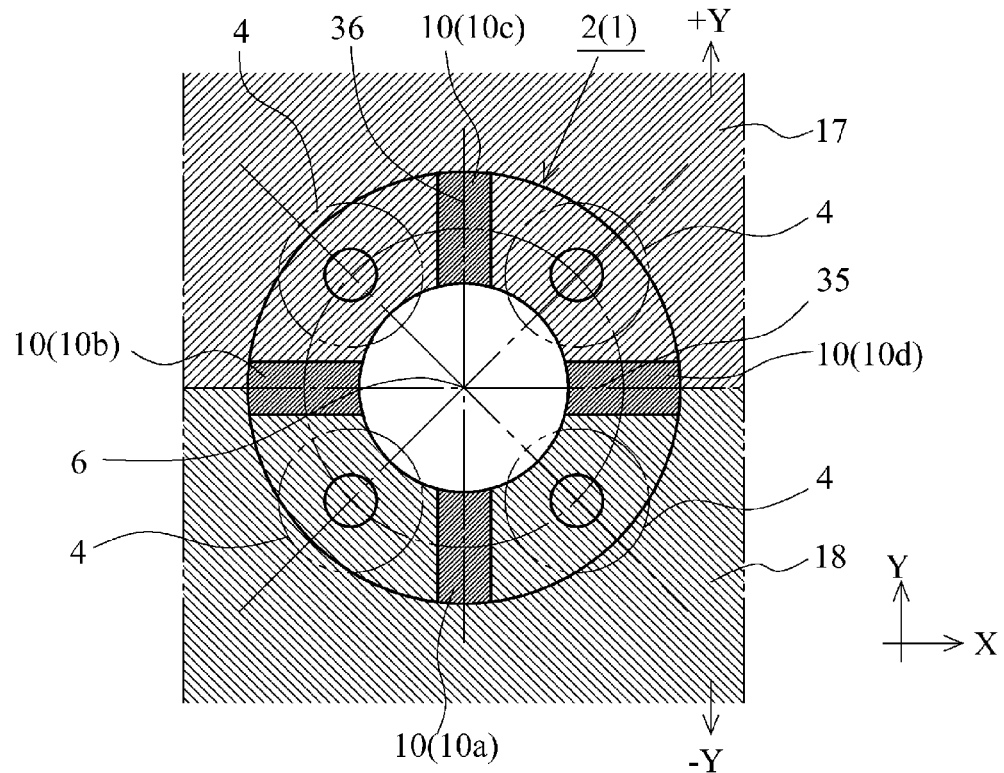
[Fig. 8]
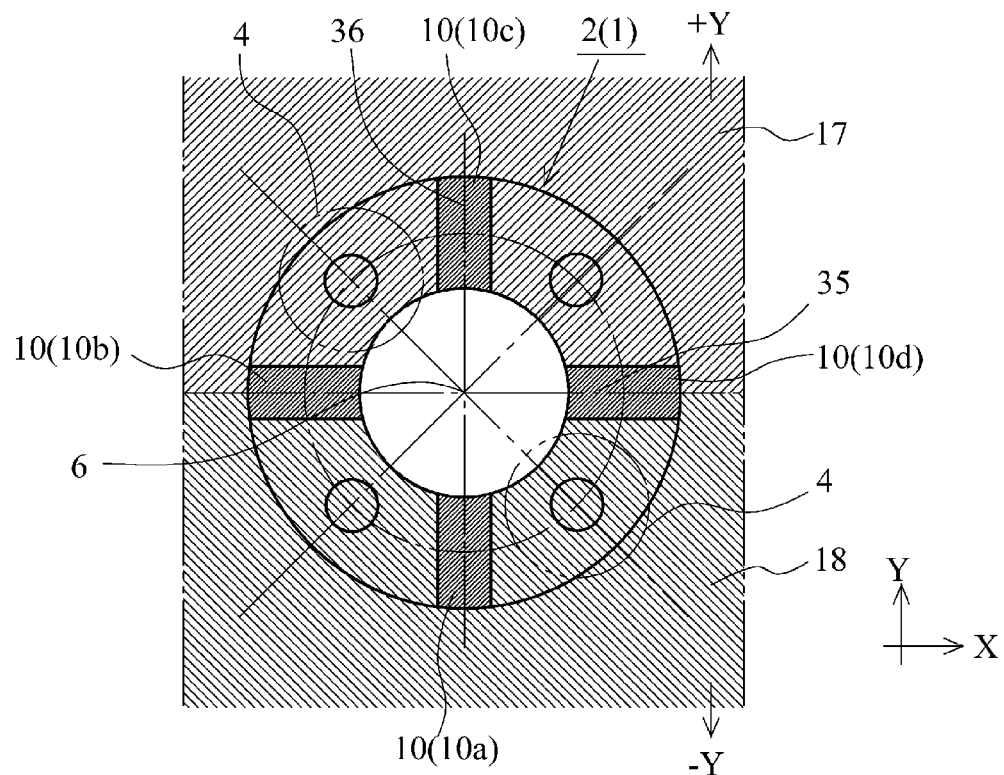

[Fig. 9]
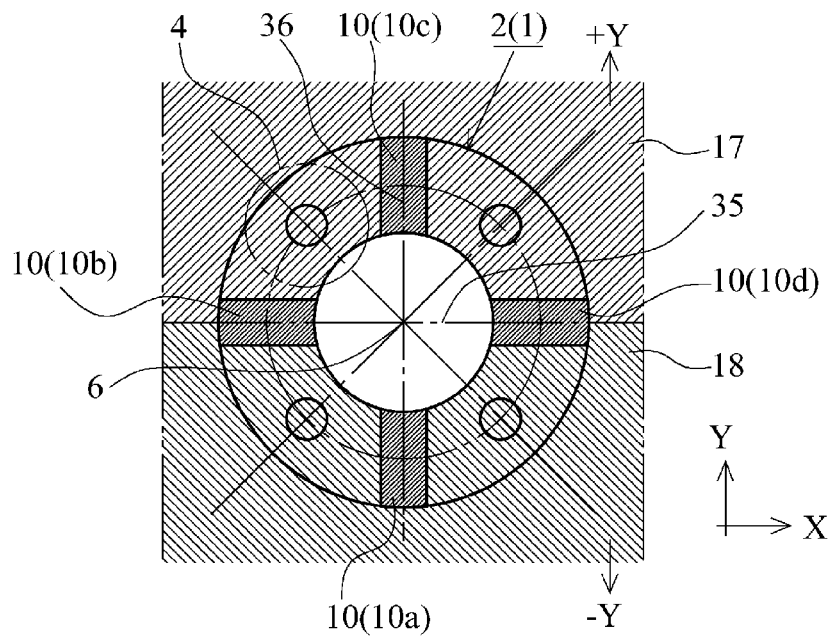
[Fig. 10]
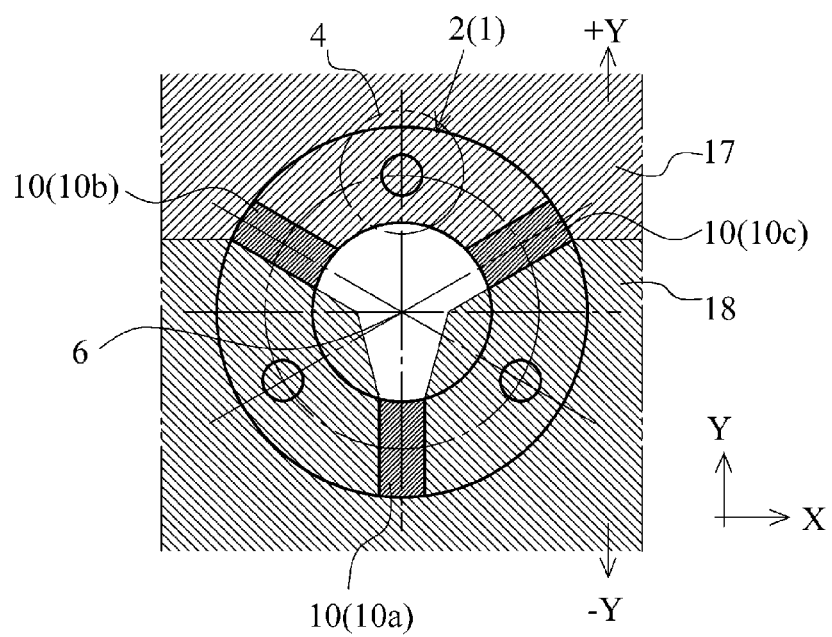

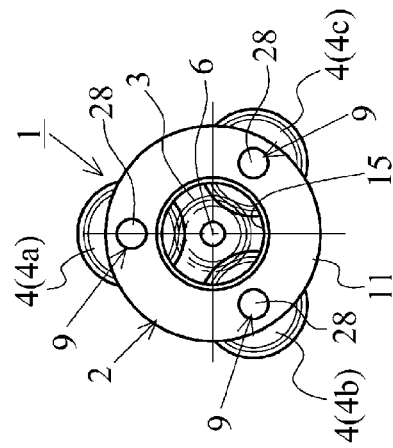
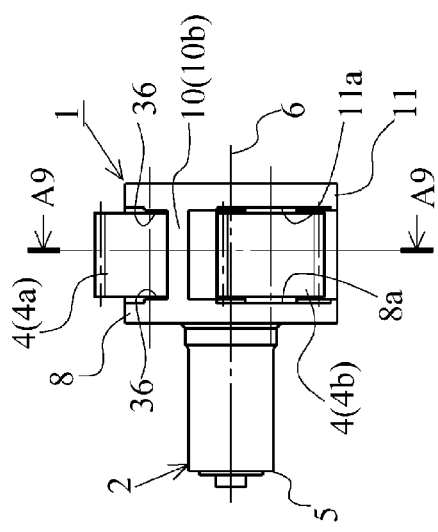
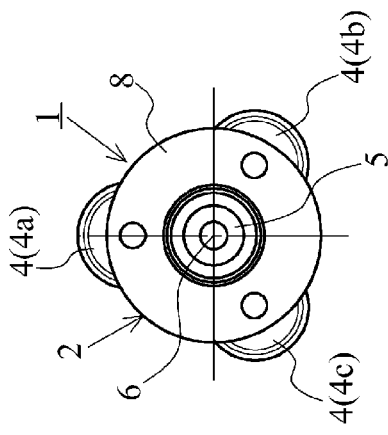

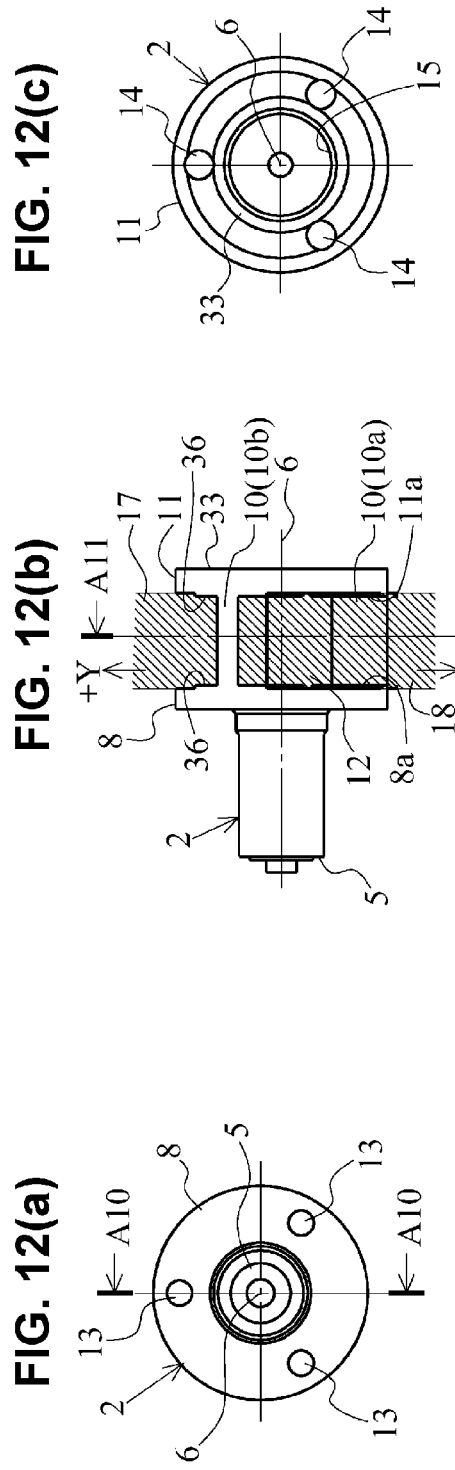
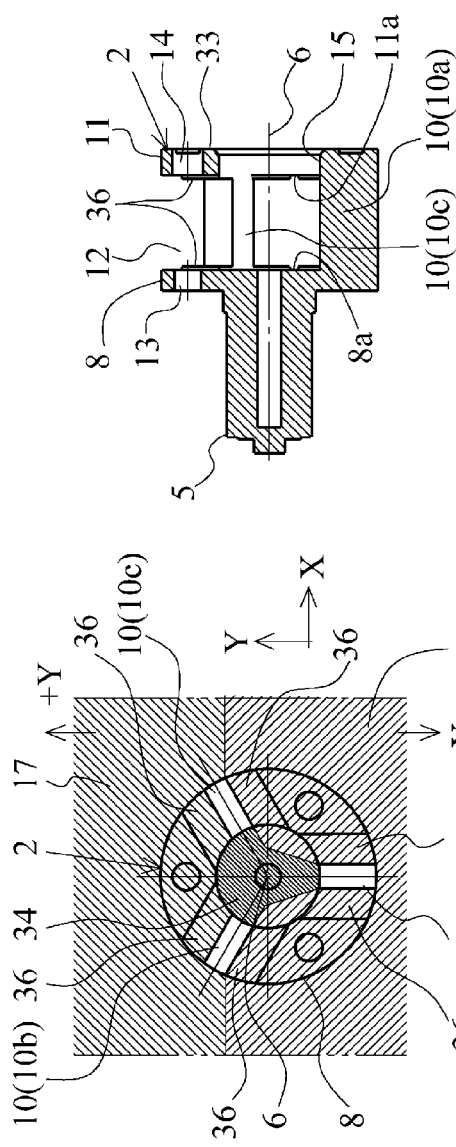

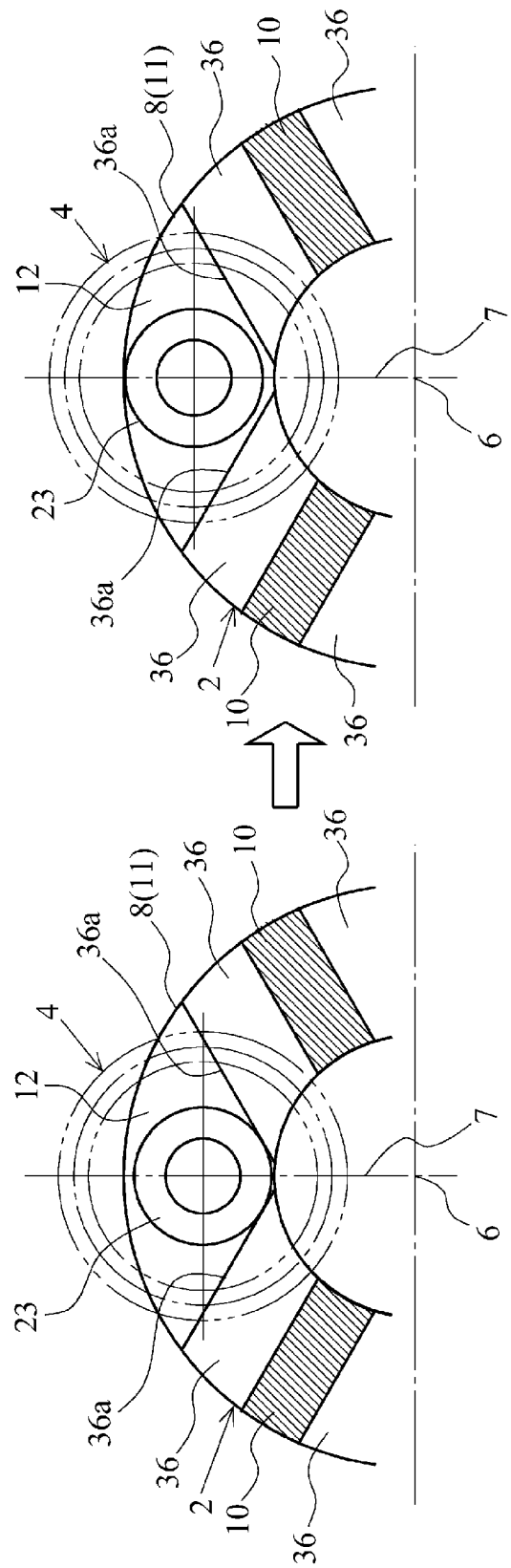

PLANETARY GEAR DEVICE CARRIER AND PLANETARY GEAR DEVICE

FIELD OF TECHNOLOGY

The present disclosure relates to a carrier for structuring a planetary gear device, and, in particular, relates to a carrier with a structure that enables a reduction in labor in assembling the planetary gear device, and to a planetary gear device comprising said carrier.

PRIOR ART

Typically a planetary gear device is that which converts rotation transmitted from a driving source, such as a motor, into rotation that is well suited for driving another driven device.

FIG. 14 (FIG. 14(a) and FIG. 14(b)) is a diagram depicting a conventional planetary gear device 101. This planetary gear device 101 that is depicted in this FIG. 14 has: a sun gear 102 positioned at the center; three planetary gears (pinion gears) 103 that mesh with this sun gear 102; and a carrier 104 for supporting each of the planetary gears 103 rotatably and supporting the planetary gears 103 so as to enable revolution around the sun gear 102. The carrier 104 has: a carrier main unit 106, formed with supporting shafts 105 for the planetary gears 103; and a carrier cover 107 to house the sun gear 102 and the planetary gears 103 between the carrier main unit 106 and the carrier cover 107. Additionally, the carrier cover 107 is secured to the carrier main unit 106 by a plurality of bolts 108 (referencing Patent Documents 1 and 2).

PRIOR-ART DOCUMENTS

Patent Documents

Patent Document 1 Japanese Unexamined Utility Model Registration Application Publication H05-090011
Patent Document 2 Japanese Unexamined Patent Application Publication 2002-013598

SUMMARY OF THE INVENTION

Problem Solved by the Present Invention

However, with the conventional planetary gear device 101, as depicted in FIG. 14, the carrier cover 107 is secured to the carrier main unit 106 by a plurality of bolts 108 after the sun gear 102 and the three planetary gears 103 are housed between the carrier main unit 106 and the carrier cover 107, increasing the labor in assembly.

Given this, the object of the present disclosure is to provide a carrier with a structure that enables a reduction in the assembly labor for the planetary gear device, and a planetary gear device comprising said carrier.

Means for Solving the Problem

The present disclosure relates to a carrier 2 for a planetary gear device wherein a gear housing space 12 for housing a sun gear 3 and planetary gears 4 is formed. In the present disclosure, the gear housing space 12 is formed between a pair of gear supporting portions 8 and 11 that support the planetary gears 4 rotatably on gear supporting shafts 9. Moreover, the pair of gear supporting portions 8 and 11 are connected integrally by a plurality of beams 10. Defining, as the X-Y plane, an imaginary plane that is perpendicular to the axis 6 of the sun gear 3, and defining, as the radial direction, the directions extending radially from the axis 6 along the X-Y plane, these beams 10 are formed along the radial direction at positions in the radial-direction outside of the sun gear 3. Moreover, the planetary gears 4 are positioned between these beams 10 and 10.

Effects of the Invention

The carrier for a planetary gear device according to the present disclosure enables a reduction in planetary gear device assembly labor when compared to the conventional carrier that is assembled from a plurality of components.

BRIEF DESCRIPTIONS OF THE DRAWINGS

FIG. 1 (FIG. 1(a) through FIG. 1(e)) is a diagram for explaining a carrier of the planetary gear device according to a first embodiment according to the present disclosure, wherein: FIG. 1(a) is a front view of the carrier; FIG. 1(b) is a side view of the carrier; FIG. 1(c) is a rear view of the carrier; FIG. 1(d) is a cross-sectional drawing of the carrier, depicted sectioned along the section A2-A2 in FIG. 1(b); and FIG. 1(e) is a cross-sectional diagram of the carrier, depicted sectioned along the section A1-A1 in FIG. 1(a).

FIG. 2 (FIG. 2(a) through FIG. 2(g)) is a diagram depicting a planetary gear device according to a second embodiment according to the present disclosure, wherein: FIG. 2(a) is a front view of the planetary gear device; FIG. 2(b) is a side view of the planetary gear device; FIG. 2(c) is a rear view of the planetary gear device; FIG. 2(d) is a cross-sectional drawing of the planetary gear device depicted sectioned along the section A3-A3 in FIG. 2(b); FIG. 2(e) is a front view of a planetary gear; FIG. 2(f) is a longitudinal sectional drawing of the planetary gear (a cross-sectional drawing of the planetary gear depicted sectioned along the section A4-A4 in FIG. 2(g)); and FIG. 2(g) is a side view of the planetary gear.

FIG. 3 (FIG. 3(a) through FIG. 3(e)) is a diagram depicting a carrier of a planetary gear device according to a second embodiment according to the present disclosure, wherein: FIG. 3(a) is a front view of the carrier; FIG. 3(b) is a side view of the carrier; FIG. 3(c) is a rear view of the carrier; FIG. 3(d) is a cross-sectional drawing of the carrier, depicted sectioned along the section A6-A6 in FIG. 3(b); and FIG. 3(e) is a cross-sectional diagram of the carrier, depicted sectioned along the section A5-A5 in FIG. 3(a).

FIG. 4 (FIG. 4(a) through FIG. 4(d)) is a diagram depicting a gear supporting shaft of the planetary gear according to the second embodiment according to the present disclosure, wherein: FIG. 4(a) is a front view of the gear supporting shaft; FIG. 4(b) is a side view of the gear supporting shaft; FIG. 4(c) is a rear view of the gear supporting shaft; and FIG. 4(d) is an exterior perspective diagram depicting the gear supporting shaft when the front side is viewed at an angle from above.

FIG. 5 (FIG. 5(a) through FIG. 5(d)) is a diagram depicting states of assembly of the planetary gear device according to the second embodiment according to the present disclosure, wherein: FIG. 5(a) is a longitudinal sectional drawing of the planetary gear device depicting a first state of assembly; FIG. 5(b) is a cross-sectional drawing, depicted sectioned along the section A7-A7 in FIG. 5(a); FIG. 5(c) is a longitudinal sectional drawing of the planetary gear device depicting a second state of assembly; and FIG. 5(d) is a cross-sectional drawing depicted sectioned along the section A8-A8 in FIG. 5(c).

FIG. 7 is a schematic diagram of a first modified example of a planetary gear device according to the first and second embodiment according to the present disclosure, corresponding to FIG. 2(d).

FIG. 8 is a schematic diagram of a second modified example of a planetary gear device according to the first and second embodiment according to the present disclosure, corresponding to FIG. 2(d).

FIG. 9 is a schematic diagram of a third modified example of a planetary gear device according to the first and second embodiment according to the present disclosure, corresponding to FIG. 2(d).

FIG. 10 is a schematic diagram of a fourth modified example of a planetary gear device according to the first and second embodiment according to the present disclosure, corresponding to FIG. 2(d).

FIG. 11 (FIG. 11(a) through FIG. 11(d)) is a diagram depicting a planetary gear device according to a third embodiment according to the present disclosure, wherein: FIG. 11(a) is a front view of the planetary gear device; FIG. 11(b) is a side view of the planetary gear device; FIG. 11(c) is a rear view of the planetary gear device; and FIG. 11(d) is a cross-sectional drawing of the planetary gear device depicted sectioned along the section A9-A9 in FIG. 11(b).

FIG. 12 (FIG. 12(a) through FIG. 12(e)) is a diagram depicting a carrier of a planetary gear device according to a third embodiment according to the present disclosure, wherein: FIG. 12(a) is a front view of the carrier; FIG. 12(b) is a side view of the carrier; FIG. 12(c) is a rear view of the carrier; FIG. 12(d) is a cross-sectional drawing of the carrier, depicted sectioned along the section A11-A11 in FIG. 12(b); and FIG. 12(a) is a cross-sectional diagram of the carrier, depicted sectioned along the section A10-A10 in FIG. 12(a).

FIG. 13 (FIG. 13(a) and FIG. 13(b)) is a diagram depicting states of assembly of the carrier and the planetary gears in the planetary gear device according to the third embodiment according to the present disclosure, wherein: FIG. 13(a) is a diagram of a first state of assembly; and FIG. 13(b) is a diagram of a second state of assembly.

Figure 14B:
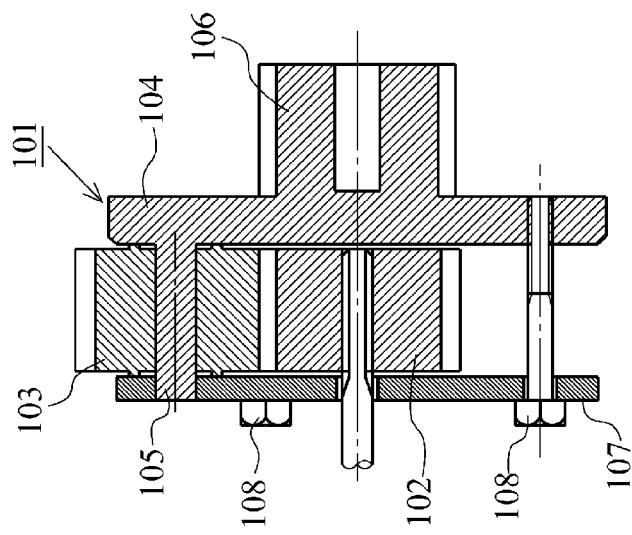
Figure 14A:
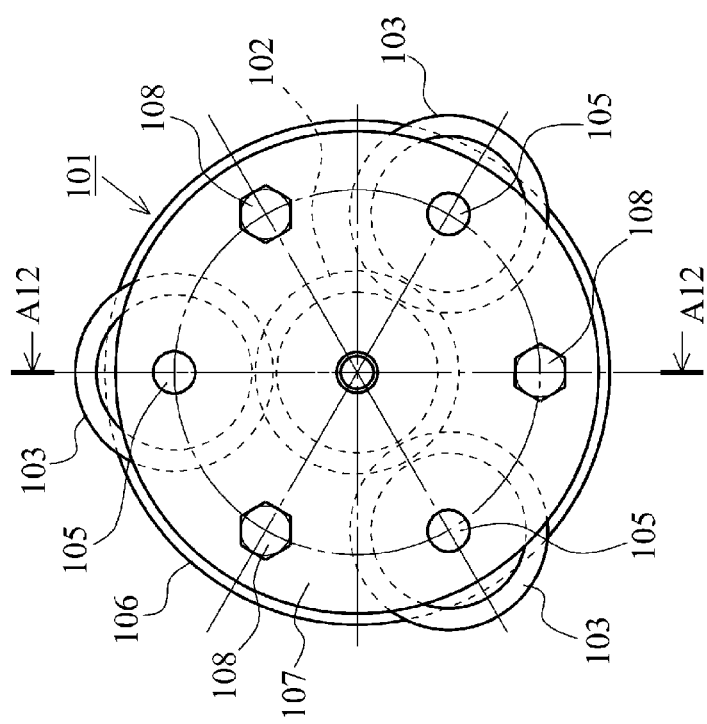

FIG. 14 (FIG. 14(a) and FIG. 14(b)) is a diagram of a conventional planetary gear device, wherein: FIG. 14(a) is a front view of the planetary gear device; and FIG. 14(b) is a cross-sectional drawing of the planetary gear device, depicted sectioned along the section A12-A12 of FIG. 14(a).

FORMS FOR CARRYING OUT THE PRESENT INVENTION

Embodiments according to the present disclosure will be described in detail below, based on the drawings.

First Embodiment

FIG. 1 (FIG. 1(a) through FIG. 1(e)) is a diagram for explaining a carrier 2 of a planetary gear device 1 according to a first embodiment according to the present disclosure. Note that FIG. 1(a) is a front view of the carrier 2. Additionally, FIG. 1(b) is a side view of the carrier 2. FIG. 1(c) is a rear view of the carrier 2. FIG. 1(d) is a cross-sectional diagram of the carrier 2, depicted sectioned along the section A2-A2 in FIG. 1(b). FIG. 1(e) is a cross-sectional drawing of the carrier 2, depicted sectioned along the section A1-A1 in FIG. 1(a).

As illustrated in FIG. 1, the planetary gear device 1 has: a sun gear 3 that is positioned in the center; three planetary gears (pinion gear) 4 that mesh with the sun gear 3; and a carrier 2 for supporting the planetary gears 4 rotatably, and for supporting the planetary gears 4 so as to enable revolution around the sun gear 3. The three planetary gears 4 are arranged at equal spacing along the outer periphery of the sun gear 3. Here, as depicted in FIG. 1(d), the planetary gear 4 that is disposed on a first imaginary line 7 that extends in the Y-axial direction along the X-Y plane through the axis 6 of the shaft portion 5 of the carrier 2 (the axis 6 of the sun gear 3) shall be termed, arbitrarily, the first planetary gear 4a. In FIG. 1(d), the two planetary gears 4 that are disposed sequentially in the counterclockwise direction (the direction rotating to the left) from the first planetary gear 4a shall be termed, arbitrarily, the second planetary gear 4b and the third planetary gear 4c.

The carrier 2 has: a shaft portion 5 that is concentric with the axis 6 of the sun gear 3; a first gear supporting plate 8 that is formed integrally with one end of the shaft portion 5; and a second gear supporting plate 11 that is formed integrally with the first gear supporting portion 8, with a plurality of beams 10 therebetween. Additionally, the carrier 2 forms a gear housing space 12, for housing the sun gear 3 and the three planetary gears 4, between the pair of gear supporting portions (the first gear supporting portion 8 and the second gear supporting portion 11). The first gear supporting portion 8 and the second gear supporting portion 11 are both formed in disk shapes, where pin holes 13 and 14 are formed at three locations that are equally spaced in the circumferential direction, such that gear supporting shafts (gear supporting pins), not shown, for supporting the planetary gears 4 rotatably, will be inserted into each of the pin holes 13 and 14. Note that in the second gear supporting portion 11, a sun gear insertion hole 15 (a hole that is formed with a larger diameter than the dimension of the outer diameter of the sun gear 3) is formed for insertion of the sun gear 3 into the gear housing space 12. Moreover, the shaft portion 5 is subjected to machining depending on the form in which the carrier 2 will be used. For example, teeth for meshing with the gear, not shown, are formed on the outer peripheral side of the shaft portions 5, or serration holes are formed along the axis 6.

Beams 10 are formed in three locations so as to be positioned between neighboring planetary gears 4 and 4, where the first gear supporting portion 8 and the second gear supporting portion 11 are connected together along the axis 6 of the shaft portion 5 (concentric with the axis 6 of the sun gear 3). Defining, as the X-Y plane, an imaginary plane that is perpendicular to the axis 6, and defining, as the radial direction, the directions that extend radially from the axis 6 along the X-Y plane, the beams 10 are formed in flat plate shapes with a slab thickness that is uniform from the position of the radial-direction outside of the sun gear 3 (a position that is on the radial-direction outside that produces a gap from the sun gear 3, and that is a position with the same radius as the sun gear insertion hole 15) toward the outside in the radial direction (to the outer edge, in the radial direction, of the first gear supporting portion 8 and the second gear supporting portion 11).

Here the beam that is positioned between the second planetary gear 4 band the third planetary gear 4c and on the first imaginary line 7 is termed, arbitrarily, the first beam 10a, where the beam 10 that is positioned between the first planetary gear 4a and the second planetary gear 4b shall be termed, arbitrarily, the second beam 10b, and the beam 10 that is positioned between the first planetary gear 4a and the third planetary gear 4c shall be termed, arbitrarily, the third beam 10c. In this way, the first through third beams 10a through 10c are positioned on respective radial direction lines that extend in the form of a "Y" on the X-Y plane, through the axis 6 of the sun gear 3.

As depicted in FIG. 1(d), the second beam 10b is angled by θ in the clockwise direction (the angle that rotates to the right) in respect to a second imaginary line 16 that extends along the X-axial direction on the X-Y plane, passing through the axis 6 of the shaft portion 5. Additionally, the third beam 10c is angled by θ in the counterclockwise direction (the angle that rotates to the left) in respect to the second imaginary line 16 that extends along the X-axial direction on the X-Y plane, passing through the axis 6 of the shaft portion 5. Furthermore, the second beam 10b and the third beam 10c are shaped with a linear symmetry in respect to the first imaginary line 7. Additionally, because the second beam 10b and the third beam 10c are positioned near to the second imaginary line 16, this enables movement of a first sliding piece 17 and of the second sliding piece 18, described below, to be carried out smoothly.

Positioning protrusions (positioning raised portions) 20 are formed corresponding to the planetary gears 4 on the side faces 8a and 11a wherein the first gear supporting portion 8 and the second gear supporting portion 11 face each other. The positioning protrusions 20 that are formed on the first gear supporting portion 8 and the second gear supporting portion 11 contact the side faces of the planetary gears 4 to constrain movement of the planetary gears 4 along the gear supporting pins (not shown), so that the planetary gears 4 and the sun gear 3 will mesh accurately, through positioning of the planetary gears 4 in the direction along the axis 6.

A first positioning protrusion 20 that is formed corresponding to the first planetary gear 4a is formed facing the outer radial direction from the position of the radial-direction outside of the sun gear 3, and along the first imaginary line 7, and has a shape that is linearly symmetrical in respect to the first imaginary line 7. Moreover, in the first positioning protrusion 20, the inner edge, in the radial direction, has an arc shape that has the same radius as the dimension of the outer diameter of the sun gear insertion hole 15 of the second gear supporting portion 11, and the outer edge, in the radial direction, is formed in a semicircular shape that is concentric with the pin holes 13 and 14. Additionally, a protrusion surface (raised portion surface) 20a that faces the side face of the first planetary gear 4a is formed, on the first positioning protrusion 20, so as to be parallel to the X-Y plane, and protrusion side faces (raised portion side face) 20b that protrude from each of the side faces 8a and 11a wherein the first gear supporting portion 8 and the second gear supporting portion 11 face each other, extending to the protrusion surface 20a, are formed so as to be parallel to the first imaginary line 7. Note that the first positioning protrusion 20 of the first gear supporting portion 8 and the first positioning protrusion 20 of the second gear supporting portion 11 are of identical shapes.

Moreover, the second positioning protrusion 20 that is formed corresponding to the second planetary gear 4b is formed along the first imaginary line 7 in the opposite direction from that of the first positioning protrusion 20, from the second beam 10b that is positioned between the first planetary gear 4a and the second planetary gear 4b. Additionally, a protrusion surface 20a that faces the side face of the second planetary gear 4b is formed, on the second positioning protrusion 20, so as to be parallel to the X-Y plane, and protrusion side faces 20b that protrude from each of the side faces 8a and 11a wherein the first gear supporting portion 8 and the second gear supporting portion 11 face each other, extending to the protrusion surface 20a, are formed so as to be parallel to the first imaginary line 7. Note that the second positioning protrusion 20 of the first gear supporting portion 8 and the second positioning protrusion 20 of the second gear supporting portion 11 are of identical shapes.

Moreover, the third positioning protrusion 20 that is formed corresponding to the third planetary gear 4c is formed along the first imaginary line 7 in the opposite direction from that of the first positioning protrusion 20, from the third beam 10c that is positioned between the first planetary gear 4a and the third planetary gear 4c. Additionally, a protrusion surface 20a that faces the side face of the third planetary gear 4c is formed, on the third positioning protrusion 20, so as to be parallel to the X-Y plane, and protrusion side faces 20b that protrude from each of the side faces 8a and 11a wherein the first gear supporting portion 8 and the second gear supporting portion 11 face each other, extending to the protrusion surface 20a, are formed so as to be parallel to the first imaginary line 7. Note that the third positioning protrusion 20 of the first gear supporting portion 8 and the third positioning protrusion 20 of the second gear supporting portion 11 are of identical shapes. Furthermore, the second positioning protrusion 20 and the third positioning protrusion 20 are shaped with a linear symmetry in respect to the first imaginary line 7.

The carrier 2, structured as described above, is formed through injecting a resin melt into the cavity of a mold (not shown), or formed through filling a cavity of a mold with molten metal. When forming the carrier 2, a first sliding piece 17, for shaping the top side parts of the second beam 10b, the third beam 10c, and the first positioning protrusion 20 side, is inserted into the cavity, and also a second sliding piece 18, for forming the bottom side parts of the second positioning protrusion 20, the third positioning protrusion 20, and the first beam 10a side is inserted into the cavity, as depicted in FIG. 1(b) and FIG. 1(d). Given this, after molding, when the first sliding piece 17 and the second sliding piece 18 are slid (separated), from an abutting state, in the vertical direction (the direction of the arrow +Y and the direction of the arrow −Y), as depicted in FIG. 1(b) and FIG. 1(d), the first through third positioning protrusions 20 and the first through third beams 10 (10a through 10c) do not interfere with the sliding movement, enabling smooth retraction from within the cavity. As a result, the carrier 2 according to the present embodiment enables the gear housing space 12 to be formed easily through the split sliding pieces (the first sliding piece 17 and the second sliding piece 18).

The carrier 2 of the planetary gear device 1 according to the present embodiment, as described above, is formed so that the first positioning protrusion 20 through third positioning protrusion 20 and first beam 10 (10a) through third beam 10 (10c) within the gear housing space 12 will not interfere with the sliding movement of the first sliding piece 17 and second sliding piece 18 that form the gear housing space 12, enabling monolithic molding within the die. As a result, in the carrier 2 of the planetary gear device 1 according to the present disclosure the pair of gear supporting portions (first gear supporting portion 8 and second gear supporting 11) are connected integrally, through the plurality of beams 10, enabling a reduction in assembly labor for the planetary gear device 1, when compared to the conventional carrier 104 that is assembled from a plurality of components.

Second Embodiment

FIG. 2 (FIG. 2(a) through FIG. 2(g)) is a diagram depicting a planetary gear device 1 according to the present embodiment. FIG. 3 (FIG. 3(a) through FIG. 3(e)) is a diagram depicting a carrier 2 of the planetary gear device 1 according to the present embodiment. In the planetary gear device 1 according to the present embodiment, the same reference symbols as for the structural parts of the planetary gear device 1 according to the first embodiment are assigned to those structural parts that are in common with those of the planetary gear device 1 according to the first embodiment, and explanations that are redundant with the planetary gear device 1 according to the first embodiment are omitted as appropriate. Note that FIG. 2(a) is a front view of the planetary gear device 1. FIG. 2(b) is a side view of the planetary gear device 1. FIG. 2(c) is a rear view of the planetary gear device 1. FIG. 2(d) is a cross-sectional drawing of the planetary gear device 1, depicted sectioned along the section A3-A3 in FIG. 2(b). FIG. 2(e) is a front view of a planetary gear 4. FIG. 2(f) is a longitudinal sectional drawing of the planetary gear 4 (a cross-sectional drawing of the planetary gear 4, depicted sectioned along the section A4-A4 in FIG. 2(g)). FIG. 2(g) is a side view of the planetary gear 4. Additionally FIG. 3 (FIG. 3(a) through FIG. 3(e)) is a diagram corresponding to FIG. 1 (FIG. 1(a) through FIG. 1(e)).

The planetary gear device 1 according to the present embodiment, as with the planetary gear device 1 according to the first embodiment, has a sun gear 3, a plurality of planetary gears 4 (first through third planetary gears 4a through 4c), and a carrier 2. Additionally, a plurality of planetary gears 4 are housed in a gear housing space 12 that is formed between the pair of gear supporting portions 8 and 11 (first gear supporting portion 8 and second gear supporting portion 11) of the carrier 2, in spaces between neighboring pairs of beams 10 and 10, and are supported rotatably on the pair of gear supporting portions 8 and 11 by gear supporting shafts 9.

Shaft holes 21, into which gear supporting shafts 9 are fitted so as to enable relative rotation thereof, are formed in the planetary gears 4 (referencing FIG. 4 and FIG. 5). Additionally, cylindrical extending portions 23 are formed on both side faces 22 and 22 of each planetary gear 4, on the peripheries of the shaft holes 21, where these extending portions 23 are configured so as to prevent movement shifting along the gear supporting shafts 9 between the pair of gear supporting portions 8 and 11. The result is that, in the carrier 2 according to the present embodiment, the positioning protrusions 20 of the carrier 2 in the first embodiment are eliminated, and the side faces 8a and 11a, wherein the pair of gear supporting portions 8 and 11 face each other, are formed in planes that are parallel with the X-Y plane. Moreover, in the present embodiment, helical gears are used for the planetary gears 4.

As illustrated in FIG. 2 (FIG. 2(a) through FIG. 2(e)) and FIG. 3(FIG. 3(a) through FIG. 3(e)), the plurality of beams 10 of the carrier 2 (the first beam 10a, second beam 10b, and third beam 10c) are formed with equal spacing around the axis 6, positioned between the individual planetary gears 4 and 4. Additionally, pairs of neighboring beams 10 and 10 are formed so that the projections thereof on the X-Y plane will form open V shapes. Moreover, in each of the beams 10 of the carrier 2, assembly positioning faces 24, for contacting the tip of a tooth of a planetary gear 4 that is housed within the gear housing space 12, and for positioning the planetary gear 4 at the position for assembling onto the gear supporting shaft 9, are formed in three locations on a side that faces the planetary gear 4 in a region that faces the planetary gear 4 (referencing FIG. 5(a) and FIG. 5(b)). The assembly positioning faces 24 at these three locations are formed along the radial direction. Moreover, at least one assembly positioning face 24 in one location, of the assembly positioning faces 24 in the three locations, is formed with a width dimension W that is described below. Given this, recessed locations 25 for adjusting the thickness of the beam 10 are formed extending in the radial direction between the individual assembly positioning faces 24 and 24. The result is the ability to adjust the rate of shrinkage of the beams 10 and the gear supporting portions 8 and 11 when molding the carrier 2 within the mold, enabling high precision molding. Moreover, in the carrier 2 according to the present embodiment, the assembly positioning faces 24 of the three locations are formed in the individual beams 10; however, there is no limitation thereto, but rather an assembly positioning face 24 with a width dimension W, described below, should be formed in at least one location in the region of each beam 10 that faces a planetary gear 4.

FIG. 4 (FIG. 4(a) through FIG. 4(d)) is a diagram depicting a gear supporting shaft 9. The gear supporting shaft 9 depicted in FIG. 4 (FIG. 4(a) through FIG. 4(d)) is made up of a large-diameter portion 28, and a small-diameter portion 30 that extends toward the tip thereof from the large-diameter portion 28. A tapered surface 31, wherein the outer diameter dimension is gradually decreased toward the tip end, is formed on the tip end side of the small-diameter portion 30 of the gear supporting shaft 9. The small-diameter portion 30 of the gear supporting shaft 9 is fitted into a pin hole 13 of the first gear supporting portion 8 and the shaft hole 21 of the planetary gear 4, to support the planetary gear 4 rotatably. Moreover, the large-diameter portion 28 of the gear supporting shaft 9 is secured to the second gear supporting portion 11 through being pressed into the pin hole 14 of the second gear supporting portion 11.

Figure 4A:
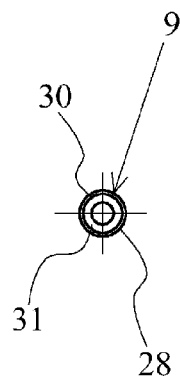
Figure 4B:
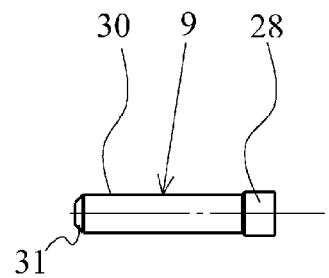
Figure 4C:
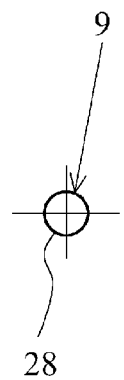
Figure 4D:
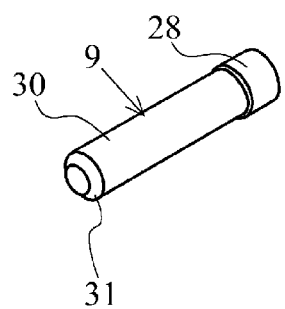
Figure 5A:
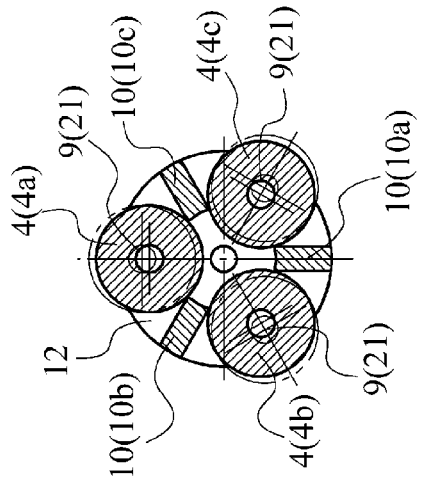
Figure 5B:
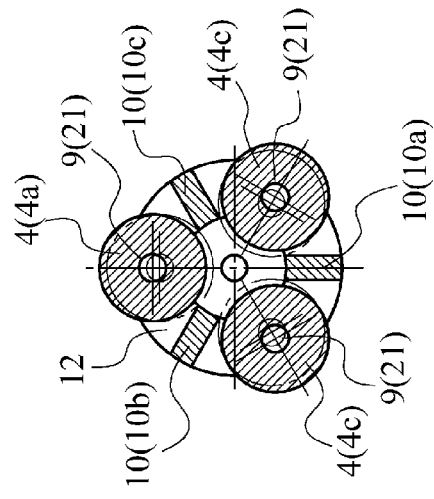
Figure 5C:
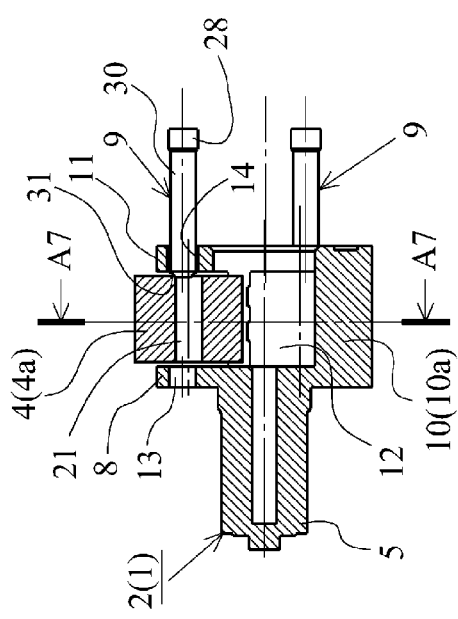
Figure 5D:
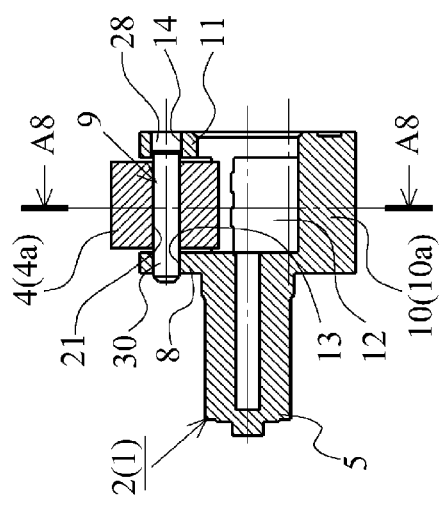

FIG. 5 (FIG. 5(a) through FIG. 5(d)) is a diagram depicting states of assembly of the planetary gear device 1 according to the second embodiment according to the present disclosure. FIG. 5(a) is a longitudinal sectional drawing of the planetary gear device 1, depicting a first state of assembly. FIG. 5(b) is a cross-sectional drawing of the planetary gear device 1, depicted sectioned along the section A7-A7 of FIG. 5(a). FIG. 5(c) is a longitudinal sectional drawing of the planetary gear device 1, depicting a second state of assembly. FIG. 5(d) is a cross-sectional drawing of the planetary gear device 1, depicted sectioned along the section A8-A8 in FIG. 5(c).

As depicted in the first state of assembly in FIG. 5(a) and FIG. 5(b), in the planetary gear 4 that is in housed between a pair of beams 10 and 10, a tooth tip is caused to contact the assembly positioning face 24 of a beam 10 in a state wherein the center of the shaft hole 21 is positioned shifted toward the inner radial direction side from the center of the pin hole 13 of the first gear supporting portion 8 and from the pin hole 14 of the second gear supporting portion 11, to be positioned at the position for assembling to the gear supporting shaft 9. The tapered surface 31 at the tip end of the gear supporting shaft 9 that is inserted from the pin hole 14 of the second gear supporting portion 11 toward the gear housing space 12 engages with the shaft hole 21 of the planetary gear 4 that is positioned in the assembly position by the pair of beams 10 and 10. When, from this state, the gear supporting shaft 9 is pushed in further toward the inside of the gear housing space 12, the tapered surface 31 of the gear supporting shaft 9 will enter into the shaft hole 21 while the planetary gear 4 is moved in the outer radial direction, and the small-diameter portion 30 of the gear supporting shaft 9 will engage with the shaft hole 21.

As depicted in the second state of assembly in FIG. 5(c) and FIG. 5(d), through insertion of the small-diameter portion 30 of the gear supporting shaft 9 into the shaft hole 21 of the planetary gear 4 and the pin hole 13 of the first gear supporting portion 8, and pressing of the large-diameter portion 28 of the gear supporting shaft 9 into the pin hole 14 of the second gear supporting portion 11, the planetary gear 4 will be supported rotatably by the gear supporting shaft 9 in a state wherein it is positioned along the radial direction of the X-Y plane (in a state wherein the center of the shaft hole 21 of the planetary gear 4, the center of the pin hole 13 of the first gear supporting portion 8, and the center of the pin hole 14 of the second gear supporting portion 11 are aligned).

Figure 6A:
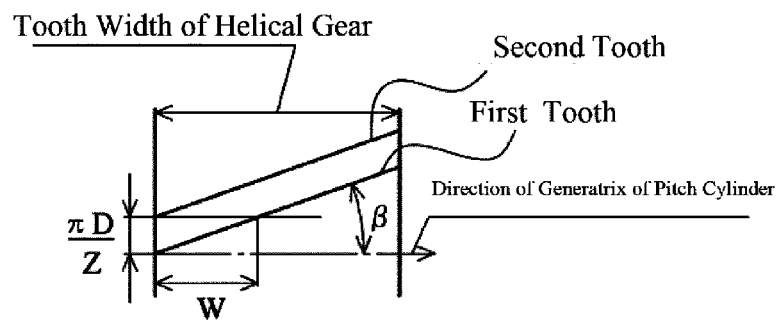
FIG. 6(a) is a first study diagram for an assembly positioning face in the carrier of the planetary gear device according to the second embodiment according to the present disclosure.

FIG. 6(a) is a first study diagram for an assembly positioning face 24 in the carrier 2 of the planetary gear device 1 according to the second embodiment according to the present disclosure. As depicted in this FIG. 6(a), when the width dimension W thereof is greater than the spacing of adjacent teeth along the generatrix direction of a pitch cylinder, the assembly positioning face 24 of the beam 10 will reliably contact a tooth tip of the planetary gear 4, enabling the planetary gear 4 to be positioned accurately at the position for assembling to the gear supporting shaft 9. That is, when the diameter of the pitch cylinder is defined as D, the twist angle is defined as β, and the number of teeth is defined as Z, the width dimension W of the assembly positioning face 24 can be determined as:

$$W > (\pi \cdot D) \cdot \cot \beta / Z = (\pi \cdot D)/(Z \cdot \tan \beta)$$

Figure 6B:
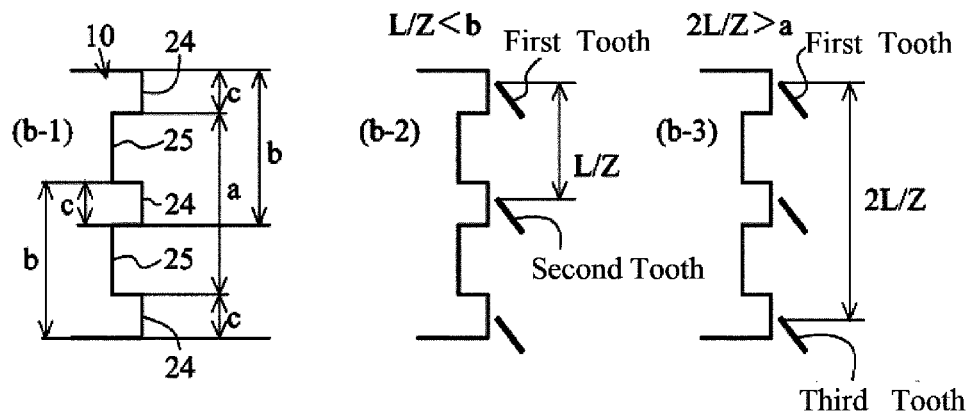
FIG. 6(b) is a second study diagram of the assembly positioning face.

FIG. 6(b) is a second study diagram for an assembly positioning face 24 in the carrier 2 of the planetary gear device 1 according to the second embodiment according to the present disclosure. As depicted in FIG. 6(b), when the assembly positioning faces 24 are formed in a plurality of locations (for example, 3 locations), and the lead of the helical gear is defined as L, the diameter of the pitch cylinder is defined as D, the twist angle is defined as β, and the number of teeth is defined as Z, in the relationship between the distance (L/Z) along the generatrix direction of the pitch cylinder of neighboring teeth tips of the planetary gear 4 and the dimension a and the dimension b did, determining the dimensions a through c so as to satisfy the relationship in Condition (1), below, given in FIG. 6(b)(b-2) and FIG. 6(b)(b-3) and designing so that the tip of one of the teeth of the planetary gear 4 will contact a assembly positioning face 24 at one of the three locations, enables the planetary gear 4 to be positioned accurately at a position for assembling to the gear supporting shaft 9.

$$□/2 < □/□ < □ \qquad \text{Condition}(1)$$

Note that L/Z can be expressed as:

$$L/Z = \pi \cdot D/(Z \cdot \tan \beta) = \pi \cdot D \cdot \cot \beta / Z = W$$

The carrier 2 according to the present embodiment, as described above, is formed through injecting a resin melt into the cavity of a mold (not shown), or formed through filling a cavity of a mold with molten metal. When forming the carrier 2, a first sliding piece 17, for shaping the top side parts of the second beam 10b and the third beam 10c sides, is inserted into the cavity, and also a second sliding piece 18, for forming the bottom side part of the first beam 10a side is inserted into the cavity, as depicted in FIG. 3(b) and FIG. 3(d). Given this, after molding, when the first sliding piece 17 and the second sliding piece 18 are slid (separated), from an abutting state, in the vertical direction (the direction of the arrow +Y and the direction of the arrow −Y), as depicted in FIG. 3(b) and FIG. 3(d), the first through third beams 10 (10a through 10c) do not interfere with the sliding movement, enabling smooth retraction from within the cavity. As a result, the carrier 2 according to the present embodiment enables the gear housing space 12 to be formed easily through the split sliding pieces (the first sliding piece 17 and the second sliding piece 18). Note that the shaft mold 34 for forming the sun gear insertion hole 15 of the second gear supporting portion 11 is configured so as to be able to slide along the axis 6 of the sun gear 3.

The carrier 2 of the planetary gear device 1 according to the present embodiment, as described above, is formed so that the first beam 10 (10a) through third beam 10 (10c) within the gear housing space 12 will not interfere with the sliding movement of the first sliding piece 17 and second sliding piece 18 that form the gear housing space 12, enabling monolithic molding within the mold. As a result, in the same manner as with the carrier of the planetary gear device according to the first embodiment, the carrier 2 of the planetary gear device 1 according to the present disclosure the pair of gear supporting portions (first gear supporting portion 8 and second gear supporting 11) are connected integrally, through the plurality of beams 10, enabling a reduction in assembly labor for the planetary gear device 1, when compared to the conventional carrier 104 that is assembled from a plurality of components.

Note that while an example was presented wherein helical gears are used for the planetary gears 4 in the planetary gear device 1 according to the present embodiment, there is no limitation thereto, but rather spur gears may be used as the planetary gears 4 instead. While in the carrier 2 of the planetary gear device 1 according to the present embodiment a helical gear was formed on the outer peripheral side of the shaft portion 5, there is no limitation thereto, but rather a spur gear, splines, or the like, may be formed on the outer peripheral side of the shaft portion 5, or nothing need be formed on the outer peripheral side of the shaft portion.

First Modified Example

FIG. 7 is a schematic diagram of a first modified example of a planetary gear device 1 according to the first and second embodiment according to the present disclosure, corresponding to FIG. 2(d).

As illustrated in FIG. 7, the first through fourth beams 10a through 10d of the carrier 2 of the planetary gear device 1 according to the present modified example are each formed on radial lines 35 and 36 that extend in the shape of a + sign on the X-Y plane, passing through the axis 6 the sun gear. Additionally, in this planetary gear device, pairs of neighboring beams 10 and 10 form open V shapes, and are configured so that the planetary gears 4 will be disposed within the gear housing space between pairs of neighboring beams 10 and 10.

The carrier 2 of such a planetary gear device 1 is formed through injecting a resin melt into the cavity of a mold (not shown), or formed through filling a cavity of a mold with molten metal. When forming the carrier 2, the first sliding piece 17 and the second sliding piece 18, which are split vertically (in the +Y direction and the −Y direction) by a radial line 35 that extends along the X-axial direction and that passes through the sun gear axis 6, are inserted into the cavity up to a position wherein they abut each other. Given this, after molding, when the first sliding piece 17 and the second sliding piece 18 are slid (separated), from an abutting state, in the vertical direction (the direction of the arrow +Y and the direction of the arrow −Y), the first through fourth beams 10 (10a through 10d) do not interfere with the sliding movement, enabling smooth retraction from within the cavity. As a result, the carrier 2 according to the present modified example enables the gear housing space 12 to be formed easily through the split sliding pieces (the first sliding piece 17 and the second sliding piece 18).

Second Modified Example

FIG. 8 is a schematic diagram of a second modified example of a planetary gear device 1 according to the first and second embodiment according to the present disclosure, corresponding to FIG. 2(d).

As illustrated in FIG. 8, in the planetary gear device 1 according to the present modified example, the planetary gears 4 of the planetary gear device 1 according to the first modified example are reduced by half, with two planetary gears 4 disposed with equal spacing around the axis 6 of the sun gear. As with the carrier 2 according to the first modified example, with the carrier 2 according to the present modified example the gear housing space 12 can be formed easily through the split sliding pieces (the first sliding piece 17 and the second sliding piece 18).

Third Modified Example

FIG. 9 is a schematic diagram of a third modified example of a planetary gear device 1 according to the first and second embodiment according to the present disclosure, corresponding to FIG. 2(d).

As illustrated in FIG. 9, in the planetary gear device 1 according to the present modified example, the planetary gears 4 of the planetary gear device 1 according to the second modified example are reduced by half, with a planetary gear 4 disposed in a single location around the axis 6 of the sun gear. As with the carrier 2 according to the first modified example, with the carrier 2 according to the present modified example the gear housing space 12 can be formed easily through the split sliding pieces (the first sliding piece 17 and the second sliding piece 18).

Fourth Modified Example

FIG. 10 is a schematic diagram of a fourth modified example of a planetary gear device 1 according to the first and second embodiment according to the present disclosure, corresponding to FIG. 2(d).

While there were three planetary gears 4 in the planetary gear device 1 according to the first and second embodiments, in the planetary gear device 1 according to the present modified example, as depicted in FIG. 10, one planetary gear 4 is positioned around the axis 6 of the sun gear. As with the carrier 2 according to the first and second modified examples, with the carrier 2 according to the present modified example the gear housing space 12 can be formed easily through the split sliding pieces (the first sliding piece 17 and the second sliding piece 18).

Third Embodiment

FIG. 11 (FIG. 11(a) through FIG. 11(d)) is a diagram depicting a planetary gear device according to a third embodiment according to the present disclosure. FIG. 12 (FIG. 12(a) through FIG. 12(e)) is a diagram depicting a carrier of a planetary gear device according to a third embodiment according to the present disclosure. planetary gear device according to the present embodiment has a distinctive feature in a configuration wherein positioning raised portions, described below, are formed on the gear supporting portion instead of on the assembly positioning faces 24 of the planetary gear device according to the second embodiment; however, the other basic structures are the same as in the planetary gear device according to the second embodiment. Consequently, in the planetary gear device according to the present embodiment, the same reference symbols as for the structural parts of the planetary gear device according to the second embodiment are assigned to those structural parts that are in common with those of the planetary gear device according to the second embodiment, and explanations that are redundant with the planetary gear device according to the second embodiment are omitted as appropriate. Note that FIG. 11(a) is a front view of the planetary gear device 1. FIG. 11(b) is a side view of the planetary gear device 1. FIG. 11(c) is a rear view of the planetary gear device 1. FIG. 11(d) is a cross-sectional drawing of the planetary gear device 1, depicted sectioned along the section A9-A9 in FIG. 11(b). Additionally FIG. 12 (FIG. 12(a) through FIG. 12(e)) is a diagram corresponding to FIG. 3.

As depicted in FIG. 11 (FIG. 11(a) through FIG. 11(d)) and FIG. 12(FIG. 12(a) through FIG. 12(e)), in the carrier 2 raised portions 36 are formed for positioning the planetary gears 4 at positions for assembly onto the gear supporting shaft 9, on the side faces 8a and 11a that are positioned on the sides of the pair of gear supporting portions 8 and 11 that are on the gear housing space 12 sides. Note that, as depicted in FIG. 2(e) through (g), the planetary gears 4 are formed with cylindrical extending portions 23 that are concentric with the centers of shaft holes 21 on the periphery of the shaft holes 21 that fit with the gear supporting shafts 9, on the side faces that face the gear supporting portions 8 and 11.

The positioning protruding portions 36 are formed so as to extend in the radial direction along the side faces wherein pairs of neighboring beams 10 and 10 face each other. That is, the positioning protruding portions 36 are formed at positions at the side faces 8a and 11a of the gear supporting portions 8 and 11, and along both side faces of the beams 10, and, together with the beams 10, are formed along the radial direction. Additionally, in the positioning raised portions 36, the heights of the protrusions from the side faces 8a and 11a of the gear supporting portions 8 and 11 are less than the lengths to which extending portions 23 of the planetary gears 4 protrude (the axial direction lengths).

FIG. 13(a) is a diagram for a first state of assembly of the carrier 2 and the planetary gears 4. As depicted in FIG. 13(a), the pair of positioning raised portions 36 and 36 formed along the side faces wherein a pair of neighboring beams 10 and 10 face each other form a V shape, and are shaped with linear symmetry in respect to a first imaginary line 7 that passes through the axis 6 of the carrier 2. Given this, with this pair of positioning raised portions 36 and 36, side faces 36a and 36a contact the extending portion 23 of the planetary gear 4 that is enclosed in the gear housing space 12 so as to position the planetary gear 4 at the position for assembly onto the gear supporting shaft 9. Here the position for assembly is a position that is shifted toward the inner radial direction side from the center of the pin hole 13 of the first gear supporting portion 8 and the center of the pin hole 14 of the second gear supporting portion 11, a position wherein, when the tapered surface 31 of the tip end of the gear supporting shaft 9 that is inserted from the pin hole 14 of the second gear supporting portion 11 toward the gear housing space 12 engages and the gear supporting shaft 9 is further pushed into the gear housing space 12 side, the tapered surface 31 of the gear supporting shaft 9 moves the planetary gear 4 toward the outside in the radial direction so that the small-diameter portion 30 of the gear supporting shaft 9 will engage with the shaft hole 21 of the planetary gear 4 (referencing FIG. 5).

FIG. 13(b) is a diagram depicting a second state of assembly of the carrier 2 and the planetary gears 4, wherein the small-diameter portion 30 of the gear supporting shaft 9 engages with the pin hole 13 of the first gear supporting portion 8, and, additionally, engages with the shaft hole 21 of the planetary gear 4, and the large-diameter portion 28 of the gear supporting shaft 9 is pressed into the pin hole 14 of the second gear supporting portion 11, so that the planetary gear 4 will be supported rotatably in a position that meshes with the sun gear 3. As depicted in this FIG. 13(b), the configuration is such that the planetary gear 4 is supported rotatably by the gear supporting shaft 9 in a position that meshes with the sun gear 3, and is away from the positioning raised portion 36 so as to not make sliding contact with the positioning raised portion 36, enabling smooth rotation.

The carrier 2 of the planetary gear device 1 according to the present embodiment, as described above, as with the carrier 2 of the planetary gear device 1 according to the second embodiment, is formed so that the first beam 10 (10a) through third beam 10 (10c) and each of the positioning raised portions 36 within the gear housing space 12 will not interfere with the sliding movement of the first sliding piece 17 and second sliding piece 18 that form the gear housing space 12, enabling monolithic molding within the die. As a result, in the same manner as with the carrier of the planetary gear device according to the first embodiment and the second embodiment the carrier 2 of the planetary gear device 1 according to the present disclosure the pair of gear supporting portions (first gear supporting portion 8 and second gear supporting 11) are connected integrally, through the plurality of beams 10, enabling a reduction in assembly labor for the planetary gear device 1, when compared to the conventional carrier 104 that is assembled from a plurality of components.

Note that the first through fourth modified examples of planetary gear devices 1 according to the first and second embodiment according to the present disclosure can be applied also to the planetary gear device 1 according to the third embodiment according to the present disclosure.

A planetary gear device according to the disclose includes a first gear support part; a second gear support part; a plurality of beams disposed between the first gear support part and the second gear support part, wherein the beams rigidly connect the first gear support part and the second gear support part such that a gear housing space is formed between the first gear support part and the second gear support part; a gear support shaft disposed in the gear housing space, wherein the gear support shaft contacts both the first gear support part and the second gear support part; a planetary gear disposed in the gear housing space, wherein the planetary gear is rotatably mounted on the gear support shaft; and a sun gear disposed in the gear housing space at a center of the first gear support part and the second gear support part such that the sun gear and the planetary gear mesh, wherein the second gear support part defines a hole disposed at the center of the second gear support part that is sized to allow the sun gear to be inserted through the second gear support part into the gear housing space. The first gear support part and the second gear support part define first and second openings in the first gear support part and second gear support part, respectively, that are coaxially aligned, wherein one of the first and second openings is configured to allow the gear support shaft to pass through the corresponding gear support part, and wherein the other of the first and second openings is configured to form a press fit on the corresponding inserted portion of the gear support shaft such that the gear support shaft is unable to rotate.

EXPLANATIONS OF REFERENCE SYMBOLS

1: Planetary Gear Device
2: Carrier
3: Sun Gear
4: Planetary Gear (Pinion Gear)
6: Axis
8: First Gear Supporting Portion (First Gear Supporting Plate)
9: Gear Supporting Shaft
10: Beam
11: Second Gear Supporting Portion (Second Gear Supporting Plate)
12: Gear Housing Space

The invention claimed is:

1. A planetary gear device, comprising:
a first gear support part;
a second gear support part;
a plurality of beams disposed between the first gear support part and the second gear support part, wherein the beams rigidly connect the first gear support part and the second gear support part such that a gear housing space is formed between the first gear support part and the second gear support part;
a gear support shaft disposed in the gear housing space, wherein the gear support shaft contacts both the first gear support part and the second gear support part;
a planetary gear disposed in the gear housing space, wherein the planetary gear is rotatably mounted on the gear support shaft; and
a sun gear disposed in the gear housing space at a center of the first gear support part and the second gear support part such that the sun gear and the planetary gear mesh, wherein the second gear support part defines a hole disposed at the center of the second gear support part that is sized to allow the sun gear to be inserted through the second gear support part into the gear housing space;
wherein the first gear support part and the second gear support part define first and second openings in the first gear support part and second gear support part, respectively, that are coaxially aligned, wherein one of the first and second openings is configured to allow the gear support shaft to pass through the corresponding gear support part, and wherein the other of the first and second openings is configured to form a press fit on the corresponding inserted portion of the gear support shaft such that the gear support shaft is unable to rotate,
wherein the planetary gear comprises cylindrical projections coaxial with the planetary gear that have a diameter less than a pitch cylinder diameter of the planetary gear, wherein each of the cylindrical projections is disposed on one of an upper surface and lower surface of the planetary gear and extends in an axial direction beyond the corresponding surface of the planetary gear such that each of the cylindrical projections contacts the first gear support part or second gear support part.

2. The planetary gear device of claim 1, further comprising:
three gear support shafts, each with a corresponding pair of first and second openings in the first gear support part and second gear support part, respectively, wherein each pair of first and second openings are coaxially aligned, wherein one of the first and second openings in each pair of first and second openings is configured to allow the gear support shaft to pass through the corresponding gear support part, and wherein the other of the first and second openings in each pair of first and second openings is configured to form a press fit on the corresponding portion of the gear support shaft such that the gear support shaft is unable to rotate;
three planetary gears disposed in the gear housing space, wherein each planetary gear is rotatably mounted on a corresponding gear support shaft in contact with the first and second gear support parts,
wherein the three planetary gears are evenly spaced around the sun gear such that a center axis of each planetary gear is located 120 degrees from center axes of the other two planetary gears,
wherein each of the three planetary gears is meshed with the sun gear, and
wherein the plurality of beams comprises three beams extending radially outwards from the sun gear such that one of the three beams is disposed between each of the planetary gears.

3. The planetary gear device of claim 1, wherein the first gear support part and the second gear support part are formed in a disk shape such that center axes of the first and second gear support parts are coaxial with an axis of rotation of the sun gear.

4. The planetary gear device of claim 1, further comprising:
a pair of planetary gear positioning surfaces disposed on two of the plurality of beams,
wherein the pair of planetary gear positioning surfaces are configured to align a shaft hole formed in the planetary gear along an axis of the planetary gear with the first and second openings in the first and second gear support parts such that a distance between the axis of the shaft hole and a center of the first and second gear support parts is less than a distance between a common axis of the first and second openings and the center of the first and second gear support parts.

5. The planetary gear device of claim 2, further comprising:
three pairs of planetary gear positioning surfaces, wherein each of the three beams includes two planetary gear positioning surfaces from two different pairs of the planetary gear positioning surfaces,
wherein each pair of planetary gear positioning surfaces is configured to align a hole formed along an axis of a corresponding planetary gear with the corresponding pair of first and second openings in the first and second gear support plates such that a distance between the axis of the shaft hole and a center of the first and second gear support parts is less than a distance between a common axis of the first and second openings and the center of the first and second gear support parts.

6. The planetary gear device of claim 1, further comprising:
a first positioning protrusion extending from a surface of the first gear support part that faces the planetary gear, wherein the first positioning protrusion is positioned in contact with an upper surface of the planetary gear; and
a second positioning protrusion extending from a surface of the second gear support part that faces the planetary gear, wherein the second positioning protrusion is positioned in contact with a lower surface of the planetary gear,
wherein the first positioning protrusion and the second positioning protrusion are sized to limit the movement of the planetary gear along the axis of the gear support shaft.

7. The planetary gear device of claim 1, wherein the plurality of beams are disposed radially with respect to the sun gear.

8. The planetary gear device of claim 4, wherein each of the planetary gear positioning surfaces is sized such that the surface will always contact a tip of a tooth of the planetary gear when the planetary gear is pressed against the planetary gear positioning surface.

9. The planetary gear device of claim 4, wherein each of the planetary gear positioning surfaces is sized such that a width of the surface is greater than a distance between two adjacent gear teeth tips of the planetary gear, wherein the width is measured in a direction perpendicular to the rotational axis of the planetary gear in a plane that is parallel to an upper surface of the planetary gear.

10. The planetary gear device of claim 1, further comprising:
a first protrusion extending from a surface of the first gear support part that faces the planetary gear, wherein the first protrusion extends radially from the center of the first gear support part to an outer perimeter of the first gear support part and wherein the first protrusion extends into the gear housing space from the surface of the first gear support part a distance less than a height of the cylindrical projection of the planetary gear; and
a second protrusion extending from the surface of the first gear support part that faces the planetary gear, wherein the second protrusion extends radially from the center of the first gear support part to the outer perimeter of the first gear support part and wherein the second protrusion extends into the gear housing space the same distance from the surface of the first gear support part as the first protrusion,
wherein the first protrusion and the second protrusion define a recess disposed between the first protrusion and second protrusion,
wherein a distance between the first protrusion and second protrusion that defines the recess is largest at the outer perimeter of the first gear support part and is smallest closest to the center of the first gear support part, and
wherein the first protrusion and the second protrusion are spaced apart such that the cylindrical projection of the planetary gear will contact both the first protrusion and the second protrusion when a distance between the center for the first gear support part and a shaft hole in the planetary gear that is coaxial with the axis of rotation of the planetary gear is less than a distance between the common axis of first and second openings corresponding to the gear support shaft and the center of the first gear support part.

11. The planetary gear device of claim 1, further comprising:
three gear support shafts, each with a corresponding pair of first and second openings in the first gear support part and second gear support part, respectively, wherein each pair of first and second openings are coaxially aligned, wherein one of the first and second openings in each pair of first and second openings is configured to allow the gear support shaft to pass through the corresponding gear support part, and wherein the other of the first and second openings in each pair of first and second openings is configured to form a press fit on the corresponding portion of the gear support shaft such that the gear support shaft is unable to rotate;

three planetary gears disposed in the gear housing space, wherein each planetary gear is rotatably mounted on a corresponding gear support shaft in contact with the first and second gear support parts, wherein the three planetary gears are evenly spaced around the sun gear such that a center axis of each planetary gear is located 120 degrees from center axes of the other two planetary gears, wherein each of the three planetary gears is meshed with the sun gear, wherein the plurality of beams comprises three beams extending radially outwards from the sun gear such that one of the three beams is disposed between each of the planetary gears, and wherein the first gear support part and the second gear support part are formed in a disk shape such that center axes of the first and second gear support parts are coaxial with an axis of rotation of the sun gear.

12. The planetary gear device of claim 1, further comprising:

three gear support shafts, each with a corresponding pair of first and second openings in the first gear support part and second gear support part, respectively, wherein each pair of first and second openings are coaxially aligned, wherein one of the first and second openings in each pair of first and second openings is configured to allow the gear support shaft to pass through the corresponding gear support part, and wherein the other of the first and second openings in each pair of first and second openings is configured to form a press fit on the corresponding portion of the gear support shaft such that the gear support shaft is unable to rotate;

three planetary gears disposed in the gear housing space, wherein each planetary gear is rotatably mounted on a corresponding gear support shaft in contact with the first and second gear support parts;

a pair of planetary gear positioning surfaces disposed on two of the plurality of beams, wherein the three planetary gears are evenly spaced around the sun gear such that a center axis of each planetary gear is located 120 degrees from center axes of the other two planetary gears, wherein each of the three planetary gears is meshed with the sun gear, wherein the plurality of beams comprises three beams extending radially outwards from the sun gear such that one of the three beams is disposed between each of the planetary gears, and wherein the pair of planetary gear positioning surfaces are configured to align a shaft hole formed in the planetary gear along an axis of the planetary gear with the first and second openings in the first and second gear support plates such that a distance between the axis of the shaft hole and a center of the first and second gear support parts is less than a distance between a common axis of the first and second openings and the center of the first and second gear support parts.

13. The planetary gear device of claim 1, further comprising:

three gear support shafts, each with a corresponding pair of first and second openings in the first gear support part and second gear support part, respectively, wherein each pair of first and second openings are coaxially aligned, wherein one of the first and second openings in each pair of first and second openings is configured to allow the gear support shaft to pass through the corresponding gear support part, and wherein the other of the first and second openings in each pair of first and second openings is configured to form a press fit on the corresponding portion of the gear support shaft such that the gear support shaft is unable to rotate;

three planetary gears disposed in the gear housing space, wherein each planetary gear is rotatably mounted on a corresponding gear support shaft in contact with the first and second gear support parts;

a pair of planetary gear positioning surfaces disposed on two of the plurality of beams, wherein the three planetary gears are evenly spaced around the sun gear such that a center axis of each planetary gear is located 120 degrees from center axes of the other two planetary gears, wherein each of the three planetary gears is meshed with the sun gear, wherein the plurality of beams comprises three beams extending radially outwards from the sun gear such that one of the three beams is disposed between each of the planetary gears, wherein the first gear support part and the second gear support part are formed in a disk shape such that center axes of the first and second gear support parts are coaxial with an axis of rotation of the sun gear, and wherein the pair of planetary gear positioning surfaces are configured to align a shaft hole formed in the planetary gear along an axis of the planetary gear with the first and second openings in the first and second gear support plates such that a distance between the axis of the shaft hole and a center of the first and second gear support parts is less than a distance between a common axis of the first and second openings and the center of the first and second gear support parts.

14. The planetary gear device of claim 1, further comprising:

three gear support shafts, each with a corresponding pair of first and second openings in the first gear support part and second gear support part, respectively, wherein each pair of first and second openings are coaxially aligned, wherein one of the first and second openings in each pair of first and second openings is configured to allow the gear support shaft to pass through the corresponding gear support part, and wherein the other of the first and second openings in each pair of first and second openings is configured to form a press fit on the corresponding portion of the gear support shaft such that the gear support shaft is unable to rotate;

three planetary gears disposed in the gear housing space, wherein each planetary gear is rotatably mounted on a corresponding gear support shaft in contact with the first and second gear support parts, wherein the three planetary gears are evenly spaced around the sun gear such that a center axis of each planetary gear is located 120 degrees from center axes of the other two planetary gears, wherein each of the three planetary gears is meshed with the sun gear, wherein the plurality of beams comprises three beams extending radially outwards from the sun gear such that one of the three beams is disposed between each of the planetary gears, and wherein the plurality of beams are disposed radially with respect to the sun gear.

15. The planetary gear device of claim 1, further comprising:

three gear support shafts, each with a corresponding pair of first and second openings in the first gear support part and second gear support part, respectively, wherein each pair of first and second openings are coaxially aligned, wherein one of the first and second openings in each pair of first and second openings is configured to allow the gear support shaft to pass through the corresponding gear support part, and wherein the other of the first and second openings in each pair of first and second openings is configured to form a press fit on the corresponding portion of the gear support shaft such that the gear support shaft is unable to rotate;

three planetary gears disposed in the gear housing space, wherein each planetary gear is rotatably mounted on a corresponding gear support shaft in contact with the first and second gear support parts, wherein the three planetary gears are evenly spaced around the sun gear such that a center axis of each planetary gear is located 120 degrees from center axes of the other two planetary gears, wherein each of the three planetary gears is meshed with the sun gear, and wherein the plurality of beams comprises three beams extending radially outwards from the sun gear such that one of the three beams is disposed between each of the planetary gears, wherein the first gear support part and the second gear support part are formed in a disk shape such that center axes of the first and second gear support parts are coaxial with an axis of rotation of the sun gear, and wherein the plurality of beams are disposed radially with respect to the sun gear.

16. The planetary gear device of claim 2, further comprising:

three pairs of planetary gear positioning surfaces, wherein each of the three beams includes two planetary gear positioning surfaces from two different pairs of the planetary gear positioning surfaces, wherein each pair of planetary gear positioning surfaces is configured to align a hole formed along an axis of a corresponding planetary gear with the corresponding pair of first and second openings in the first and second gear support plates such that a distance between the axis of the shaft hole and a center of the first and second gear support parts is less than a distance between a common axis of the first and second openings and the center of the first and second gear support parts, and wherein each of the planetary gear positioning surfaces is sized such that the surface will always contact a tip of a tooth of the planetary gear when the planetary gear is pressed against the planetary gear positioning surface.

17. The planetary gear device of claim 2, further comprising:

three pairs of planetary gear positioning surfaces, wherein each of the three beams includes two planetary gear positioning surfaces from two different pairs of the planetary gear positioning surfaces, wherein each pair of planetary gear positioning surfaces is configured to align a hole formed along an axis of a corresponding planetary gear with the corresponding pair of first and second openings in the first and second gear support parts such that a distance between the axis of the shaft hole and a center of the first and second gear support parts is less than a distance between a common axis of the first and second openings and the center of the first and second gear support parts, and wherein each of the planetary gear positioning surfaces is sized such that a width of the surface is greater than a distance between two adjacent gear teeth tips of the planetary gear, wherein the width is measured in a direction perpendicular to the rotational axis of the planetary gear in a plane that is parallel to an upper surface of the planetary gear.

18. The planetary gear device of claim 1, further comprising:

three gear support shafts, each with a corresponding pair of first and second openings in the first gear support part and second gear support part, respectively, wherein each pair of first and second openings are coaxially aligned, wherein one of the first and second openings in each pair of first and second openings is configured to allow the gear support shaft to pass through the corresponding gear support part, and wherein the other of the first and second openings in each pair of first and second openings is configured to form a press fit on the corresponding portion of the gear support shaft such that the gear support shaft is unable to rotate;

three planetary gears disposed in the gear housing space, wherein each planetary gear is rotatably mounted on a corresponding gear support shaft in contact with the first and second gear support parts;

a pair of planetary gear positioning surfaces disposed on two of the plurality of beams, wherein the three planetary gears are evenly spaced around the sun gear such that a center axis of each planetary gear is located 120 degrees from center axes of the other two planetary gears, wherein each of the three planetary gears is meshed with the sun gear, and wherein the plurality of beams comprises three beams extending radially outwards from the sun gear such that one of the three beams is disposed between each of the planetary gears, wherein the first gear support part and the second gear support part are formed in a disk shape such that center axes of the first and second gear support parts are coaxial with an axis of rotation of the sun gear, and wherein the pair of planetary gear positioning surfaces are configured to align a shaft hole formed in the planetary gear along an axis of the planetary gear with the first and second openings in the first and second gear support parts such that a distance between the axis of the shaft hole and a center of the first and second gear support portions is less than a distance between a common axis of the first and second openings and the center of the first and second gear support parts.

19. The planetary gear device of claim 1, further comprising:

three gear support shafts, each with a corresponding pair of first and second openings in the first gear support part and second gear support part, respectively, wherein each pair of first and second openings are coaxially aligned, wherein one of the first and second openings in each pair of first and second openings is configured to allow the gear support shaft to pass through the corresponding gear support part, and wherein the other of the first and second openings in each pair of first and second openings is configured to form a press fit on the corresponding portion of the gear support shaft such that the gear support shaft is unable to rotate;

three planetary gears disposed in the gear housing space, wherein each planetary gear is rotatably mounted on a corresponding gear support shaft in contact with the first and second gear support parts, wherein the three planetary gears are evenly spaced around the sun gear such that a center axis of each planetary gear is located 120 degrees from center axes of the other two planetary gears, wherein each of the three planetary gears is meshed with the sun gear, wherein the plurality of beams comprises three beams extending radially outwards from the sun gear such that one of the three beams is disposed between each of the planetary gears, wherein the first gear support part and the second gear support part are formed in a disk shape such that center axes of the first and second gear support parts are coaxial with an axis of rotation of the sun gear, and wherein the plurality of beams are disposed radially with respect to the sun gear.

* * * * *